Dec. 26, 1961     A. G. SCHNEIDER     3,014,430
HYDRAULIC TORQUE CONVERTER
Filed May 19, 1958     3 Sheets-Sheet 1
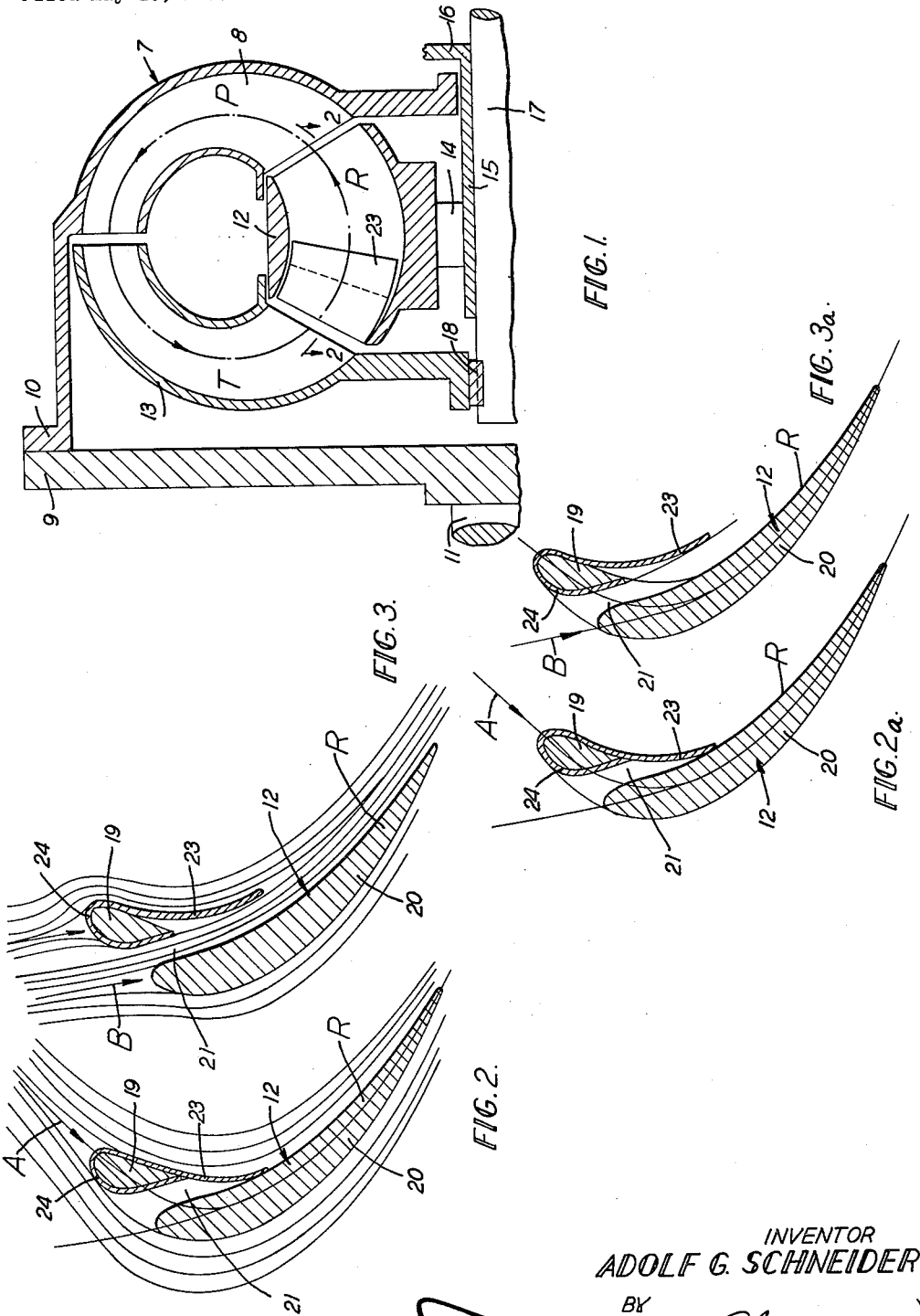
INVENTOR
ADOLF G. SCHNEIDER
BY
ATTORNEY

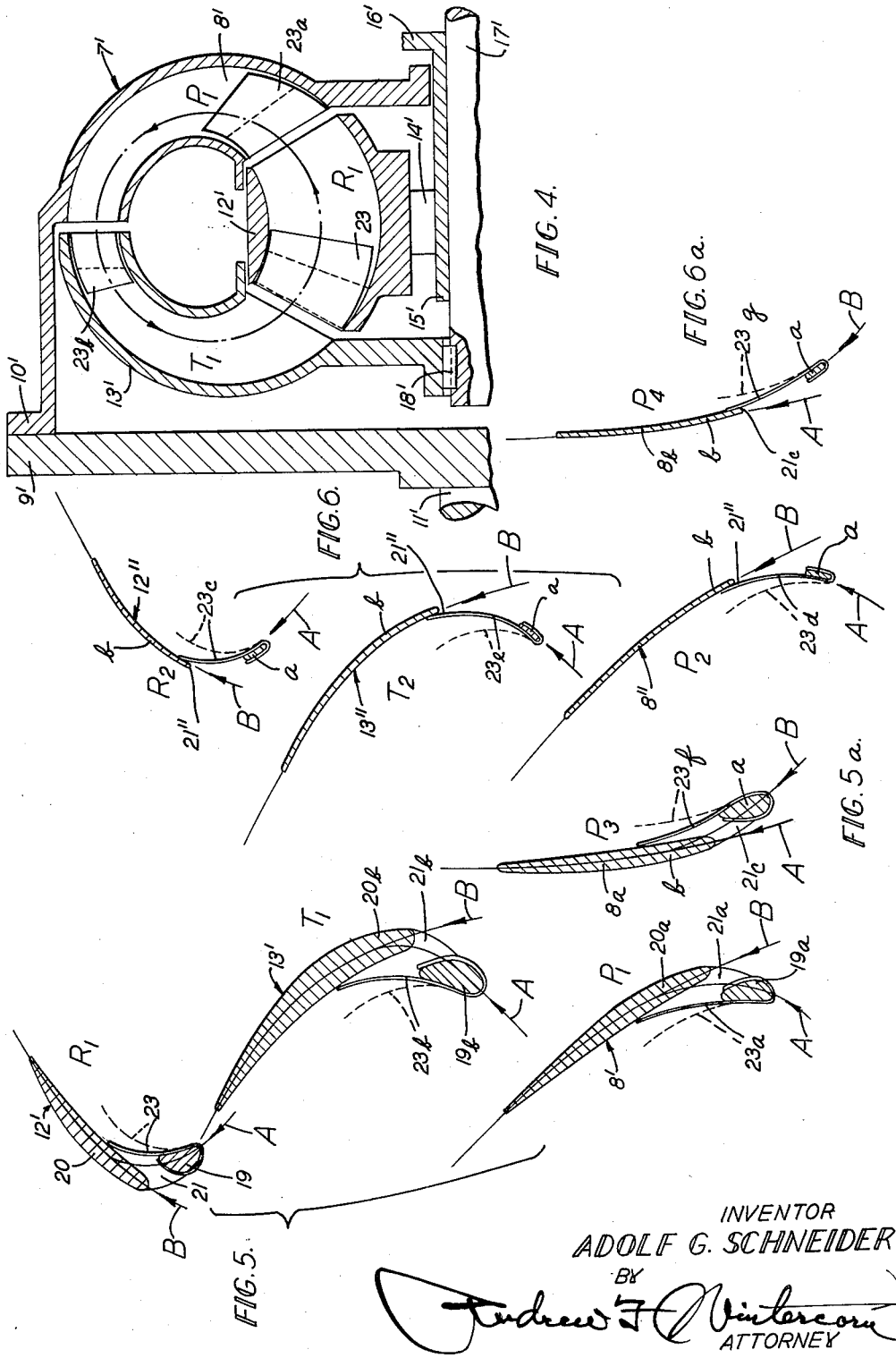

Dec. 26, 1961  A. G. SCHNEIDER  3,014,430
HYDRAULIC TORQUE CONVERTER

Filed May 19, 1958  3 Sheets-Sheet 3

INVENTOR
ADOLF G. SCHNEIDER
BY
ATTORNEY

United States Patent Office 3,014,430
Patented Dec. 26, 1961

3,014,430
HYDRAULIC TORQUE CONVERTER
Adolf G. Schneider, Muncie, Ind., assignor to Schneider Brothers Company, Muncie, Ind., a copartnership
Filed May 19, 1958, Ser. No. 736,114
6 Claims. (Cl. 103—97)

This invention relates to torque converters of the turbine type having bladed elements defining a closed fluid circuit, and comprising at least a pump element, a turbine element and a reaction element.

The principal object of the invention is to provide an improved hydraulic torque converter construction whereby an increase in the range of highly efficient operation is obtained by reduction of shock and turbulence losses at the entrance portions of the blades, this object being attained as follows:

(1) By providing a hydraulic torque converter element or elements having variable inlet blade angles in the range of operation.

(2) By providing for an automatic change of the inlet angles to conform to the instantaneous angle of fluid flow during torque multiplication.

(3) By providing primary and secondary blades that include flexible and resilient leaf spring flap portions which provide different inlet angles for lower speed ratios and higher speed ratios.

(4) By providing primary and secondary blades, the former having the aforementioned flexible and resilient leaf spring flap portions attached thereto which when engaged with the secondary blades, serve to define a continuous streamline on the pressure side of both blades.

(5) By providing primary and secondary blades, the former having the aforementioned flexible and resilient sheet metal flap portions attached thereto pressed toward engagement with the secondary blades to define a continuous streamline on the pressure side of the two blades at an efficient angle for lower speed ratios, these flap portions disengaging from the secondary blades more or less at higher speeds to conform to the different fluid angles, giving automatically a change in the inlet angles for the secondary blades, and consequently less shock losses at higher speed ratios.

I am aware that others have provided movable elements designed to shift so as to provide variable inlet angles under the influence of changing fluid flow conditions, but they don't provide a streamline section on both the primary and secondary blades and a streamline section on the composite blade structure, whereas my invention provides such sections with a cast construction of the primary and secondary blades, and with that I obtain nearly shockless operation over a wide speed range.

The invention is illustrated in the accompanying drawings, in which—

FIG. 1 is an axial section through a hydraulic torque converter embodying my invention, showing only the upper half portion, so as to enable showing the parts on a larger scale;

FIGS. 2 and 2a, which are taken on the line 2—2 of FIG. 1, show the primary and secondary blades with the flexible resilient leaf spring flap portion on the primary blade engaging the secondary blade to provide a continuous streamline on the pressure side of the two blades, as for low speed operation;

FIGS. 3 and 3a are similar views showing the flap portion in distended relationship to the secondary blade for a different inlet angle B as for higher speed operation, making the primary and secondary blades substantially completely independent;

FIG. 4 is another axial section along the lines of FIG. 1 but showing primary and secondary blades with flexible resilient leaf spring flap portions on the pump, turbine, and reactor elements;

Figure 7:
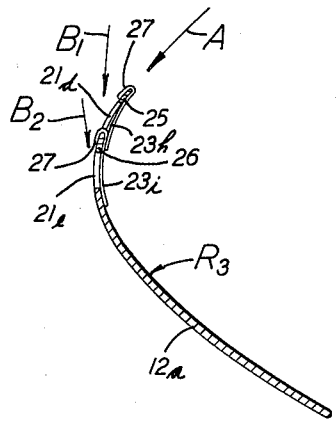
Figure 9:
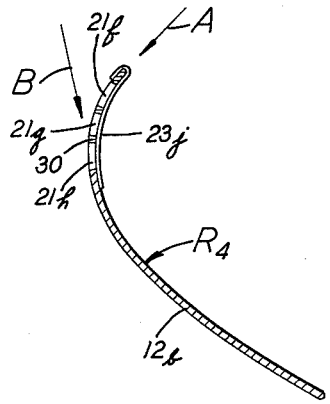
Figure 8:
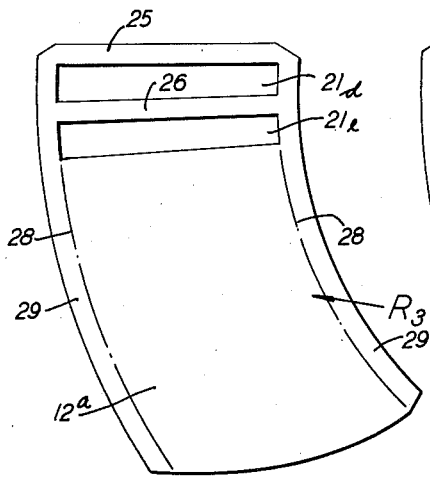
Figure 10:
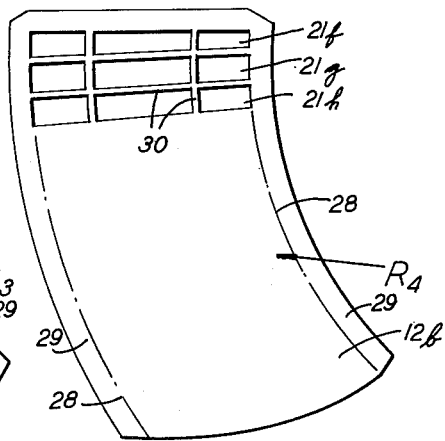

FIG. 5 is a more or less diagrammatic sectional view of the three sets of blades showing the form thereof along the middle streamline, as indicated by the dot and dash section line in FIG. 4, the blades being all cast to a streamlined form in cross-section, the entering end of each of the three elements having the flap portion shown in full lines in the low speed position and in dotted lines in a higher speed position;

FIG. 6 is a view similar to FIG. 5 but showing blades of formed sheet metal construction instead of castings;

FIGS. 5a and 6a are related to FIGS. 5 and 6, respectively, but show a pump blade with different inlet and outlet angles;

FIG. 7 is a section of another formed sheet metal blade having a larger opening in the entrance portion of the blade to permit a greater angle variation in fluid flow at the entrance, this blade having the opening divided and having a separate flap for each portion of the opening;

FIG. 8 is a face view of the blade of FIG. 7 without the flaps and laid flat;

FIG. 9 is a view similar to FIG. 7 showing another blade with a plurality of window openings stamped through the entrance portion leaving very narrow ribs to provide abutment for the flap arranged to cover said openings, and FIG. 10 is a face view of the blade of FIG. 9 without the flap and the blade laid flat.

Similar reference numerals are applied to corresponding parts throughout the views.

Referring to the drawings, and first to FIGS. 1 to 3a, the reference numeral 7 designates a Föttinger type hydraulic torque converter, the pump impeller element 8 of which is marked P for identification, and is connected to the flywheel 9, as indicated at 10. Flywheel 9 turns with the driving shaft 11. 12 is the reaction element, marked R for identification, and 13 is the turbine wheel element of the torque converter, marked T for identification. At 14 is indicated a free wheeling or over-running clutch through which the reaction element 12 is connected to a sleeve 15 that is carried by the stationary back wall 16 of a housing (not shown) enclosing the torque converter 7. The driven shaft 17 operates in the sleeve 15 as a bearing, and is keyed to the turbine wheel element 13, as indicated at 18.

The direction of flow of the liquid from the pump element P through the turbine element T and thence through the reaction element R is indicated by the arrows, and in accordance with my invention, I provide at least the reaction element R of an improved construction to increase the range of highly efficient operation by reducing shock and turbulence losses at the entrance of the blades of said reaction element, as shown in FIGS. 2–3a. The reaction element R has the body portion of each of its blades cast in the form of a primary blade or vane 19 and a secondary blade or vane 20, both of streamlined cross-section, as shown, the primary blade or vane having its small tapered trailing end in spaced relation to the large rounded entering end of the secondary blade or vane so as to define a channel or passage 21 of relatively unrestricted form therebetween, and said primary blade or vane carrying a relatively thin, flexible, resilient leaf spring flap 23 which acts as an automatic valve that is closed by engagement with the front or pressure side of the secondary blade or vane, as shown in FIGS. 2 and 2a, at low turbine speed, but is arranged to be forced open more or less by the pressure of fluid flowing through the channel or passage 21 at higher turbine speed, as illustrated in FIGS. 3 and 3a. In this way, different inlet angles of the blades are provided for lower speed ratios and higher speed ratios, the inlet angle changing automatically to conform to the angle of the fluid flow during torque multiplication. In the closed position the flap 23 cooperates with the primary and secondary blades forming a continuous streamline on the front or pressure side of the two blades, as clearly appears in FIGS. 2 and 2a. If desired, the trailing edge portion of the flap 23 could be tapered to eliminate the slight shoulder defined by this edge portion, but the thinness of the metal used, makes that precaution unnecessary for most applications. The attaching end portion 24 of the flap 23 is suitably looped around and secured to the primary blade or vane 19 to form the streamlined exterior thereof. The composite three-portion blade structure therefore is of streamline form in both the open and closed positions of the flap 23 for minimum shock loss under all operating conditions.

With the improved blade construction in the reaction element R illustrated in FIGS. 2–3a, the efficiency of operation is greatly improved as a result of the reduction in shock and turbulence losses at the entrance of the blades in the reaction element R, different inlet angles for different speed ratios being obtained, as shown in FIGS. 2 to 3a, by virtue of the flap portions 23 on the blades, the flexible, resilient leaf spring flap portions 23 forming a continuous streamline on the pressure side of the primary and secondary blades 19 and 20 in the position of said flap portions for low speed drive, during which operation the entrance angle, as indicated at A in FIGS. 2 and 2a, is most efficient for lower speed ratios. These flap portions disengage from blade 20 at higher speed ratios, opening channel 21, as shown in FIGS. 3 and 3a, giving automatically a change in the inlet angle of the blade to the angle of fluid flow, as indicated at B in FIGS. 3 and 3a, resulting in less shock losses under higher speed operating conditions.

Referring next to FIGS. 4 and 5, the flap portions 23 on the body portion of the blades of the reaction element $R_1$ are the same as in FIGS. 1 and 2–3a, and accordingly the primary and secondary blade portions are numbered 19 and 20, respectively, the same as in the other figures, and likewise the intermediate opening or passage 21. Similar flap portions 23a and 23b are provided on the entrance portions of the body portion of the blades of the pump element $P_1$ and turbine wheel element $T_1$, respectively. The body portion of each blade of the pump element $P_1$ includes a primary blade 19a and secondary blade 20a with an intermediate opening or passage 21a. The body portion of each blade in the turbine wheel element $T_1$ includes a primary blade portion 19b and a secondary blade portion 20b with an intermediate throat or passage 21b. In FIG. 5 the flaps 23, 23a and 23b are shown in full lines in the closed position for low speed operation, and in dotted lines in an open position for higher speed operation, the extent of opening, of course, depending upon the increase in speed of operation, so that the fluid entrance angle at low speed is as represented by the arrows A, and for a higher speed by the arrows B. It goes without saying that if all three elements, $R_1$, $P_1$ and $T_1$ of the torque converter have the blades thereof constructed, as shown in FIG. 5, with primary and secondary blade portions of streamlined cross-section with throats or passages therebetween, and have flap portions on the pressure sides of the blades closing the throats under fluid pressure to define in effect a single piece blade of streamlined cross-section in each case, most efficient operation is obtainable by reason of the reduction in shock and turbulence losses, especially since the flap portions upon opening in accordance with the changes in the angles of fluid flow as the speed of operation changes permit fluid flow between the primary and secondary blade portions of each element in accordance with the change of angle of fluid flow as the speed of operation changes.

While I have shown cast blade constructions in FIGS. 1 through 5, it should, of course, be understood that the invention is not limited in its application to such constructions and accordingly, as shown in FIG. 6, the flaps 23c, 23d and 23e, all of which are shown in full lines in the closed position for slow speed operation A and dotted lines in open position for higher speed operation B, are shown as mounted on blades 8″, 12″ and 13″, the body portion of each of which is of formed sheet metal. Of course, the departure from streamlined cross-section means a sacrifice in the efficiency of operation as compared with constructions shown in the other figures previously described, but a torque converter made along these lines still represents a considerable improvement over earlier designs by virtue of the flaps 23c, 23d and 23e providing variable inlet blade angles, the flaps in closed position on the pressure side of the primary blade portions a and secondary blade portions b of blades 8″, 12″ and 13″ forming a continuous streamline on the pressure side during low speed operation, as shown in full lines in FIG. 6, but shifting their positions at higher speed ratios according to the change in fluid angles to allow fluid flow through the openings 21″ between the primary and secondary blade portions a and b, with resulting reduced shock losses at higher speed ratios, similarly as with the other constructions previously described. The flap portions 23c, 23d and 23e are all shown as having an attaching end portion looped around and suitably secured to the primary blade portions a of blades 8″, 12″ and 13″ as by riveting, welding or bending.

FIGS. 5a and 6a show sections of blades 8a and 8b for pump elements $P_3$ and $P_4$, respectively, the body portion of each of which has opposite curvature in relation to blades 8′ and 8″ shown in FIGS. 5 and 6 so that the flaps 23f and 23g are closed in relation to the openings 21c defined between the primary and secondary blade portions a and b, respectively, on the pressure side of the blades for high speed operation, as indicated by arrows B, the flaps 23f and 23g being, however, arranged to open under lower speed operating conditions more or less according to the different fluid angles, one of which is indicated by the arrows A in FIGS. 5a and 6a with resultant decreased shock losses at lower speed ratios. In other words, my invention is shown to be applicable just as well to torque converters designed for the highest efficiency of operation at lower speed ratios.

Referring next to FIGS. 7 and 8, I have shown a blade 12a for a reaction element $R_3$, the blade having the body portion thereof stamped from a single piece of sheet metal with two parallel openings 21d and 21e punched in the entrance portion in parallel relation leaving narrow webs 25 and 26 in parallel relationship on which flaps 23h and 23i are mounted, as indicated at 27 in FIG. 7, normally spring pressed toward closed position in abutment with the pressure side of the blade closing the openings 21d and 21e during low speed operation when the fluid enters at the angle A. At a higher speed when the fluid enters at the angle $B_1$ flap 23h will open but flap 23i will remain closed. At a still higher speed of operation when the fluid is at the angle $B_2$ the other flap 23i will also open. It is, therefore, apparent that with this construction I am enabled to provide a large gap between the blade sections permitting a greater angle variation at the entrance without too much flexing of the flap portions 23h and 23i that might ultimately result in permanent deformation thereof. In FIG. 8 the dot and dash lines at 28 indicate the inner and outer torus of the torque converter wheel, the marginal edge portions 29 of the blades being cast, welded or riveted to these portions of the wheels to complete the wheels with their bladings.

Referring next to FIGS. 9 and 10, the blade 12b for the reaction element $R_4$ is similar to the blade 12a but has three rows of window openings 21f, 21g and 21h punched in the entrance portion of the body thereof with narrow ribs 30 left therebetween to provide supporting abutments for the flap 23j which is normally spring-pressed toward engagement with the pressure side of the blade covering these window openings and remains in that position during low speed operation when the entrance angle is as indicated at A. At a higher speed, when the entrance angle of the fluid is as indicated at B, the flap 23j opens more or less, depending upon the speed of operation and the angle of entering fluid flow. The larger gap which these window openings afford between the blade sections permits a greater angle variation at the entrance without deformation of the flap portion. Here again, the dot and dash lines 28 and the marginal portions 29 have the same significance as in FIG. 8.

It is believed the foregoing description conveys a good understanding of the objects and advantages of my invention. The appended claims have been drawn to cover all legitimate modifications and adaptations.

I claim:

1. In a fluid transmission, a blade having a curved entrance portion and a relatively straight exit portion in trailing relationship thereto, the curved entrance portion having a channel provided therein opening to the front or pressure side of the exit portion, and a curved spring flap means rigidly mounted by its one end on the entrance portion of said blade and extending inwardly in the direction of fluid flow relative to the blade to guide the fluid under different operating conditions flowing at different angles relative to said blade, said flap means being normally spring-pressed to closed position with respect to said channel into abutment with said exit portion of the blade on the front or pressure side thereof but being yieldable under pressure of the fluid flowing relative to said blade to open said channel more or less depending upon the direction of flow of said fluid relative to said blade and flap means.

2. A structure as set forth in claim 1, wherein the channel in the entrance portion of the blade is between a primary blade portion on the entrance portion and a secondary blade portion in trailing relation to the primary blade portion on the exit portion, the flap means being carried on the primary blade portion and arranged to engage the front or pressure side of the secondary blade portion.

3. A structure as set forth in claim 2, wherein the primary blade portion and secondary blade portion are both of streamlined cross-section.

4. In a fluid transmission, a blade having a curved entrance portion and a relatively straight exit portion in trailing relationship thereto, the curved entrance portion having parallel channels provided therein transversely thereof in longitudinally spaced relation opening to the front or pressure side of the exit portion, and curved spring flaps, one for covering the front or exit end of each of said channels, each rigidly mounted by its one end on the curved entrance portion and extending toward the exit portion to guide the fluid flowing differently relative to said blade under different operating conditions, said flaps being normally spring-pressed to closed position but being yieldable under pressure of fluid to open said channels more or less depending upon the direction of the fluid flow relative to the blade and flaps.

5. A structure as set forth in claim 4, wherein the free end of a flap overlaps the leading or attached end of the next flap in trailing relationship to the first mentioned flap.

6. A structure as set forth in claim 4, including narrow rib portions in spaced parallel relationship extending longitudinally of the entrance portion of the blade dividing the channels into rows of window openings of substantially uniform size, the ribs furnishing support for the flaps and reducing deformation of said flaps under pressure of the fluid thereon.

References Cited in the file of this patent

UNITED STATES PATENTS

| | | |
|---|---|---|
| 2,222,618 | Jandasek | Nov. 26, 1940 |
| 2,271,919 | Jandasek | Feb. 3, 1942 |
| 2,351,516 | Jandasek | June 13, 1944 |
| 2,406,499 | Jandasek | Aug. 27, 1946 |
| 2,440,825 | Jandasek | May 4, 1948 |
| 2,627,724 | Seybold | Feb. 10, 1953 |